(12) United States Patent
Haramein

(10) Patent No.: US 8,073,094 B2
(45) Date of Patent: Dec. 6, 2011

(54) DEVICE AND METHOD FOR SIMULATION OF MAGNETOHYDRODYNAMICS

(76) Inventor: Nassim Haramein, Holualoa, HI (US)

( * ) Notice: Subject to any disclaimer, the term of this patent is extended or adjusted under 35 U.S.C. 154(b) by 1016 days.

(21) Appl. No.: 11/976,364

(22) Filed: Oct. 24, 2007

(65) Prior Publication Data
US 2009/0108682 A1   Apr. 30, 2009

(51) Int. Cl.
*H05H 1/22* (2006.01)
*H05H 1/02* (2006.01)
*H05H 1/12* (2006.01)

(52) U.S. Cl. ........ 376/133; 376/134; 376/135; 376/136; 376/127; 376/128; 376/129; 376/130; 376/103; 376/104; 376/105; 376/106; 376/107; 315/111.51; 315/111.61; 315/111.41

(58) Field of Classification Search ............. 315/111.21, 315/111.41, 111.51, 111.61, 111.71, 111.91; 376/103–107, 127–130, 133–136; *H05H 1/22, H05H 1/02, 1/12*
See application file for complete search history.

(56) References Cited

U.S. PATENT DOCUMENTS

| | | | |
|---|---|---|---|
| 554 A * | 1/1838 | Dawson | 185/32 |
| 4,274,919 A * | 6/1981 | Jensen et al. | 376/133 |
| 4,654,561 A * | 3/1987 | Shelton | 315/111.71 |
| 4,663,567 A * | 5/1987 | Wong | 315/111.21 |
| 6,027,603 A | 2/2000 | Holland et al. | |
| 6,237,526 B1 * | 5/2001 | Brcka | 118/723 I |
| 6,313,555 B1 * | 11/2001 | Blumenstock et al. | 310/90.5 |
| 6,484,492 B2 | 11/2002 | Meholic et al. | |
| 6,575,889 B1 | 6/2003 | Reiffel | |
| 7,079,001 B2 | 7/2006 | Nordberg | |
| 7,079,085 B2 * | 7/2006 | Lee et al. | 343/867 |
| 7,139,349 B2 * | 11/2006 | Leung | 376/108 |
| 2003/0057845 A1 * | 3/2003 | Edamura et al. | 315/111.21 |
| 2003/0062840 A1 * | 4/2003 | Moroz | 315/111.51 |
| 2003/0192644 A1 * | 10/2003 | Pu et al. | 156/345.28 |
| 2005/0157832 A1 * | 7/2005 | Nordberg | 376/133 |

(Continued)

FOREIGN PATENT DOCUMENTS
JP         63178432       *   7/1988

OTHER PUBLICATIONS

Allen, S. W., et al., The Relation Between Accretion Rate and Jet Power in X-Ray Luminous Elliptical Galaxies, Mon. Not. R. Astron. Soc. vol. 372 (1) pp. 21-30, 2006.

(Continued)

*Primary Examiner* — Quyen Leung
*Assistant Examiner* — Terrance Kenerly
(74) *Attorney, Agent, or Firm* — Fish & Associates,PC

(57) ABSTRACT

A magnetohydrodynamic simulator that includes a plasma container. The magnetohydrodynamic simulator also includes an first ionizable gas substantially contained within the plasma container. In addition, the magnetohydrodynamic simulator also includes a first loop positioned adjacent to the plasma container, wherein the first loop includes a gap, a first electrical connection on a first side of the gap, a second electrical connection of a second side of the gap, and a first material having at least one of low magnetic susceptibility and high conductivity. The first loop can be made up from an assembly of one or a plethora or wire loop coils. In such cases, electrical connection is made through the ends of the coil wires. The magnetohydrodynamic simulator further includes an electrically conductive first coil wound about the plasma container and through the first loop.

21 Claims, 4 Drawing Sheets

U.S. PATENT DOCUMENTS

2006/0060464 A1    3/2006    Chang
2006/0082238 A1*   4/2006    Kusase et al. ............... 310/166

OTHER PUBLICATIONS

Amatucci, W. E., et al., Dusty Plasma Dynamics in the NRL Space Physics Simulation Chamber Laboratory, Plasma Physics Division, Naval Research Laboratories, 2003.

Berhanu, M., et al., Magnetic field reversals in an experimental turbulent dynamo, EPL, vol. 77, 59001, 2007.

Casse, F., MHD Accretion-Ejection Flows Astrophysics and Space Science vol. 293, No. 1-2, Aug. 2004.

Casse, F., & Keppens, R., Radiatively Inefficient MHD Accretion-Ejection Structures, The Astrophysical Journal vol. 601, Part 1, pp. 90-103, 2004.

Combi, M. R., Studies of Tenuous Planetary Atmospheres, Technical Report, NASA/CR-1997-208226; NAS 1.26:208226 Space Physics Research Lab. Jan. 1997.

Coppi, B., Angular Momentum Transport at All Scales in the Universe, 44th Annual Meeting of the Division of Plasma Physics, APS Session QP1—Poster Session VII., Rosen Centre Hotel Orlando, Florida, Nov., 2002.

Coppi, B. & Coppi, P. S., Angular Momentum Transport in Thin Accretion Disks and Intermittent Accretion, Phys. Rev. Lett. vol. 87, 051101, 2001.

de Kool, M., et al., Magnetic Fields in Accretion Discs, Pub. of the Astronomical Society of Australia, vol. 16, p. 225, 1999.

Ekenbäck, A., Holmstrom, M., MHD modeling of the interaction between the solar wind and solar system objects, in Proceedings of PARA'04 State-of-the-Art, Lecture Notes in Computer Science, Springer-Verlag, Berlin, 2004.

Gailitis, A., et al., Magnetic Field Saturation in the Riga Dynamo Experiment, Phys. Rev. Lett. vol, 86 pp. 3024-3027, 2001.

Garofalo, D. & Reynolds, C. S., Sporadically Torqued Accretion Disks Around Black Holes, The Astrophysical Journal, vol. 624 (1), pp. 94-102, May 2005.

Haramein, N. &. Rauscher, E. A, The Origin of Spin: A Consideration of Torque and Coriolis Forces in Einstein's Field Equations and Grand Unification Theory, In: *The Search for Unity in Physics: Extending the Standard Model*, R. L. Amoroso, B. Lehnert & J-P Vigier (Eds.) Special Issue of the Noetic Journal vol. 6 No. 1-4, 2005a.

Haramein, N. &. Rauscher, E. A, Collective Coherent Oscillation Plasma Modes in the Surrounding Media of Black Holes and the Vacuum Structure—Quantum Processes with Considerations of Spacetime Torque and Coreolis Forces, In: *The Search for Unity in Physics: Extending the Standard Model*, R. L. Amoroso, B. Lehnert & J-P Vigier (Eds.) Special Issue of the Noetic Journal vol. 6 No. 1-4, 2005b.

Haramein, N., *A Scaling Law for Organized Matter in the Universe*, [AB.006], Session AB—Astronomy and Space Physics, Joint Fall Meeting of the Texas Sections of the APS and AAPT, and Zone 13 of the SPS, Texas Christian University; Fort Worth, Texas, Oct. 4-6, 2001.

Hawley, J. F ., Global Magnetohydrodynamical Simulations of Accretion Tori, The Astrophysical Journal, vol. 528, 462, 2000.

Hawley, J. F., Balbus, S. A., Stone, J. M., A Magnetohydrodynamic Nonradiative Accretion Flow in Three Dimensions Astrophysical Journal Letters vol. 554, Part 2, pp. L49-L52(2001).

Hawley, J. F. & Balbus, S. A., The Dynamical Structure of Nonradiative Black Hole Accretion Flows, The Astrophysical Journal, vol. 573, pp. 738-748, 2002.

Hawley J. F. & Krolik, J. H., Global MHD Simulation of the Inner Accretion Disk in a Pseudo-Newtonian Potential, The Astrophysical Journal, vol. 548, p. 348, 2001.

Hawley, J. F. & Krolik, J. H., High Resolution Simulations of the Plunging Region in a Pseudo-Newtonian Potential: Dependence on Numerical Resolution and Field Topology, The Astrophysical Journal, vol. 566, p. 164, 2002.

Ji, H. S., et al., Hydrodynamic Turbulence Cannot Transport Angular Momentum Effectively in Astrophysical Disks, Nature vol. 444, pp. 343-346, Nov. 16, 2006.

Kuncic, Z. & Bicknell, G. V., Dynamics and Energetics of Turbulent, Magnetized Disk Accretion around Black Holes: A First-Principles Approach to Disk-Corona-Outflow Coupling, The Astrophysical Journal, vol. 616(1) pp. 669-687, 2004.

Lechte, C., et al., Microscopic Structure of Turbulence in the Torsatron TJ-K, American Physical Society, 45th Annual Meeting of the Division of Plasma Physics, Albuquerque, New Mexico, Meeting ID: DPP03, abstract #UP1.044, Oct. 27-31, 2003.

Ledvina, S. A., et al., A Three-Dimensional MHD Model of Plasma Flow Around Titan: A Tool for Cassini Mission Planning, Planetary and Space Science, vol. 46(9) pp. 1175-1191, 1998.

Marsch, E., Acceleration potential and angular momentum of undamped MHD-waves in stellar winds, Astronomy and Astrophysics, vol. 164(1), pp. 77-85, 1986.

Mitra, D. and Pandit, R., Dynamics of Passive-Scalar Turbulence, Phys. Rev. Lett. vol. 95, 144501, 2005.

Monchaux, R. et al., Generation Of Magnetic Field by Dynamo Action in a Turbulent Flow of Liquid Sodium, Phys. Rev. Lett. vol. 98, 044502, 2007.

Papaloizou & Nelson, The Interaction of a Giant Planet With a Disc with MHD Turbulence I: The Initial Turbulent Disc Models, MNRAS vol. 339, p. 923, 2003a.

Pishkalo, M. I., Reconstruction of the Heliospheric Current Sheet Tilts Using Sunspot Numbers, Solar Physics, vol. 233 (2), 2006.

Reynolds, C. S., et al., Trapping of Magnetic Flux by the Plunge Region of a Black Hole Accretion Disk, The Astrophysical Journal, vol. 651 (1), pp. 1023-1030, 2006.

Rieger, F. M. & Duffy, P., Particle Acceleration Timescales in Relativistic Shear Flows, 22nd Texas Symposium on Relativistic Astrophysics at Stanford University, Dec. 13-17, 2004.

Sanderson, T. R., Observations of the Sun's magnetic field during the recent solar maximum, Journal of Geophysical Research, vol. 108, No. A1, p. 1035, 2003.

Spence, E. J. et al., Observation of a Turbulence-Induced Large Scale Magnetic Field, Phys. Rev. Lett. vol. 96, 055002, 2006.

Stefani, F., et al. Experimental Evidence for Magnetorotational Instability in a Taylor-Couette Flow Under the Influence of a Helical Magnetic Field, Phys. Rev. Lett. vol. 97, 184502, 2006.

Volk, R., et al. Transport of Magnetic Field by a Turbulent Flow of Liquid Sodium, Phys. Rev. Lett. vol. 97, 074501, 2006.

Alboussiere, T., et al., MHD Turbulence in a Rotating Spherical Couette Flow of Sodium with an Imposed Dipolar Magnetic Field, GTP Workshop on Modeling MHD Turbulence; Applications to Planetary and Stellar dynamos, At: NCAR, Boulder, CO, USA, Jun. 27-30, 2006.

Cravens T.E., et al., A two-dimensional multifluid MHD model of Titan's plasma environment, Planetary and Space Science vol. 46, Issues 9-10, pp. 1193-1205, 1998.

Daglis, I. A., et al., Key features of intense geospace storms—A comparative study of a solar maximum and a solar minimum storm, Planetary and Space Science, vol. 55, pp. 32-52, 2007.

Hawley, J. F., Global MHD Simulations of Cylindrical Keplerian Disks, The Astrophysical Journal, vol. 554, p. 534, 2001.

Ji, H.S. et al., Current-Sheet Buildup and Magnetic Reconnection in Weakly Ionized Solar Lower Atmosphere, Solar Physics, vol. 198(1), pp. 133-148, Jan. 2001.

Papaloizou & Nelson, The Interaction of a Giant Planet with a Disc with MHD Turbulence II: The Interaction of the Planet With the Disc, MNRAS vol. 339, pp. 993-1005, 2003b.

Schulz, M., Fourier Parameters of Heliospheric Current Sheet and Their Significance, Space Science Reviews, vol. 72, No. 1-2, pp. 149-152, 1995.

University of New Mexico, Design of the New Mexico Liquid Sodium α-ω Dynamo Experiment, Dec. 24, 2001.

Alboussiere, T., et al., MHD Turbulence in a Rotating Spherical Couette Flow of Sodium with an Imposed Dipolar Magnetic Field, GTP Workshop on Modeling MHD Turbulence; Applications to Planetary and Stellar dynamos, At: NCAR, Boulder, CO, USA, Jun. 27-30, 2006.

Cravens T.E., et al., A two-dimensional multifluid MHD model of Titan's plasma environment, Planetary and Space Science vol. 46, Issues 9-10, pp. 1193-1205, 1998.

Daglis, I. A., et al., Key features of intense geospace storms—A comparative study of a solar maximum and a solar minimum storm, Planetary and Space Science, vol. 55, pp. 32-52, 2007.

Hawley, J. F., Global MHD Simulations of Cylindrical Keplerian Disks, The Astrophysical Journal, vol. 554, p. 534, 2001.

Ji, H.S. et al., Current-Sheet Buildup and Magnetic Reconnection in Weakly Ionized Solar Lower Atmosphere, Solar Physics, vol. 198(1), pp. 133-148, Jan. 2001.

Papaloizou & Nelson, The Interaction of a Giant Planet with a Disc with MHD Turbulence II: The Interaction Of The Planet With The Disc, MNRAS vol. 339, pp. 993-1005, 2003b.

Schulz, M., Fourier Parameters of Heliospheric Current Sheet and Their Significance, Space Science Reviews, vol. 72, No. 1-2, pp. 149-152, 1995.

University of New Mexico, Design of the New Mexico Liquid Sodium $\alpha$-$\omega$ Dynamo Experiment, Dec. 24, 2001.

* cited by examiner

DEVICE AND METHOD FOR SIMULATION OF MAGNETOHYDRODYNAMICS

FIELD OF THE INVENTION

The present invention relates generally to devices and methods useful in replicating the magnetohydrodynamics occurring in a variety of astrophysical objects. More particularly, the present invention relates to devices and methods useful in performing such replication in a low-energy, controlled laboratory environment.

BACKGROUND OF THE INVENTION

Approximately ninety-six percent of the observable universe is made up of matter that is in a plasma state. As such, in an effort to better understand the universe, the scientific community has dedicated a significant amount of time, energy, and resources to the generation and study of plasmas. The results of some of these efforts are discussed below.

Scientific studies have indicated that plasmas of widely different geometric scales experience similar phenomena. For example, similar types of plasma phenomena are observed in galactic clusters, galactic formations, galactic halos, black hole ergospheres, other stellar objects, and planetary atmospheres. In order to take advantage of this apparent geometric-scale-independence of plasmas, scientific devices have been manufactured that attempt to replicate the motion of the ions in large-scale plasmas (e.g., plasmas of galactic formations) on geometric scales that are containable in an earthly laboratory setting.

To date, these devices have utilized liquids (i.e., liquid sodium) or charged liquids (i.e., charged liquid sodium) to model large astrophysical plasmas. These devices have also relied upon the use of strong magnetic fields to guide ions in the liquids or charged liquids along paths that ions in a plasma would follow.

The above notwithstanding, by definition, actual plasmas are gaseous. In other words, actual plasmas do not contain matter in a liquid or charged liquid state and using ions in liquids or charged liquids to replicate the behavior of ions in a plasma may have shortcomings. Accordingly, it would be desirable to provide novel devices capable of simulating the magnetohydrodynamics of large-scale plasmas in a non-liquid medium.

SUMMARY OF THE INVENTION

The foregoing needs are met, to a great extent, by certain embodiments of the present invention. For example, according to one embodiment of the present invention, a magnetohydrodynamic simulator is provided. The magnetohydrodynamic simulator includes a plasma container. The magnetohydrodynamic simulator also includes an first ionizable gas substantially contained within the plasma container. In addition, the magnetohydrodynamic simulator also includes a first loop positioned adjacent to the plasma container, wherein the first loop includes a gap, a first electrical connection on a first side of the gap, a second electrical connection of a second side of the gap, and a first material having at least one of low magnetic susceptibility and high conductivity. The magnetohydrodynamic simulator further includes an electrically conductive first coil wound about the plasma container and through the first loop.

There has thus been outlined, rather broadly, an embodiment of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
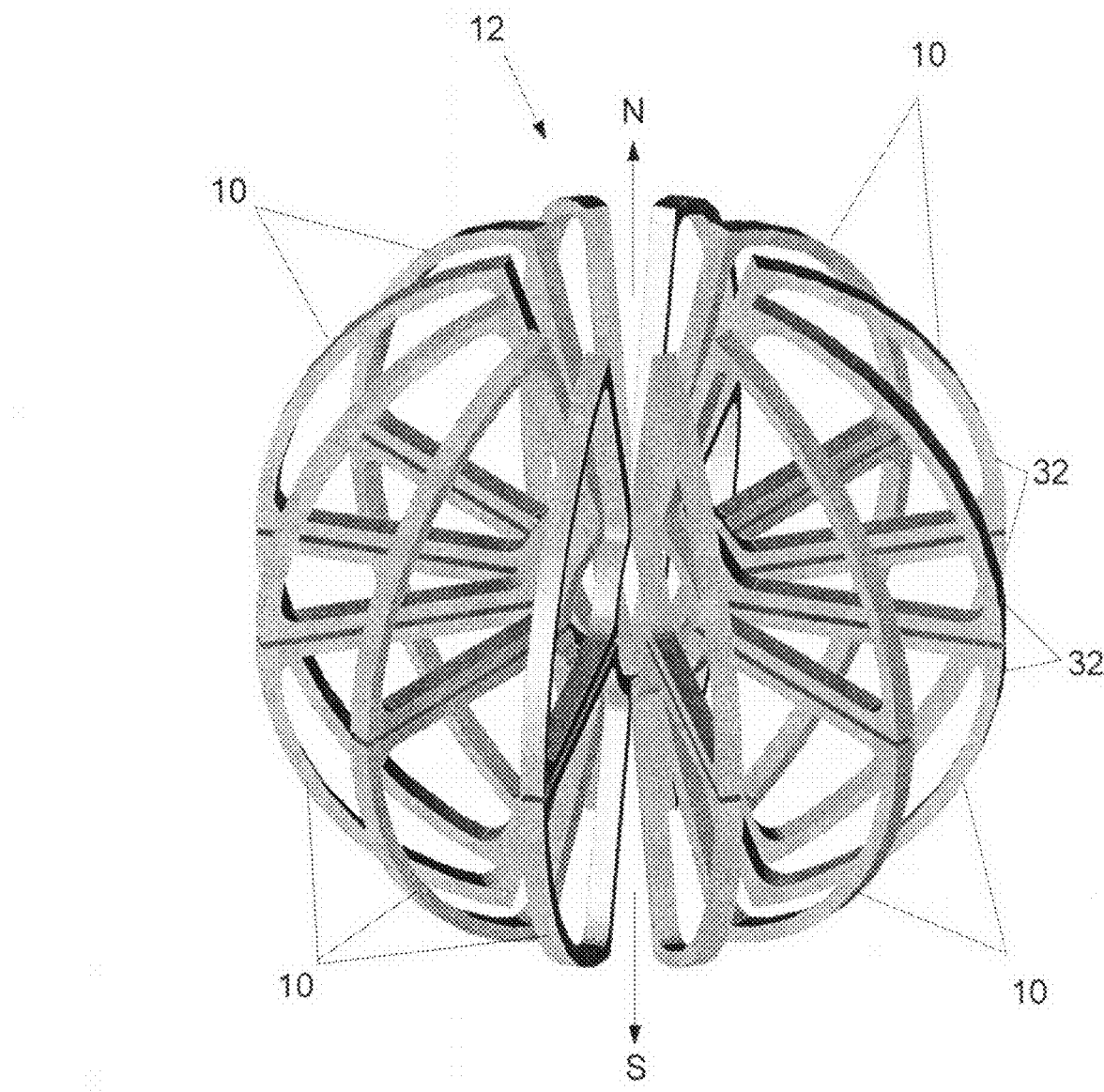
FIG. 1 illustrates a perspective view of a plurality of ribs included in a magnetohydrodynamic (MHD) simulator according to an embodiment of the present invention.
Figure 2:
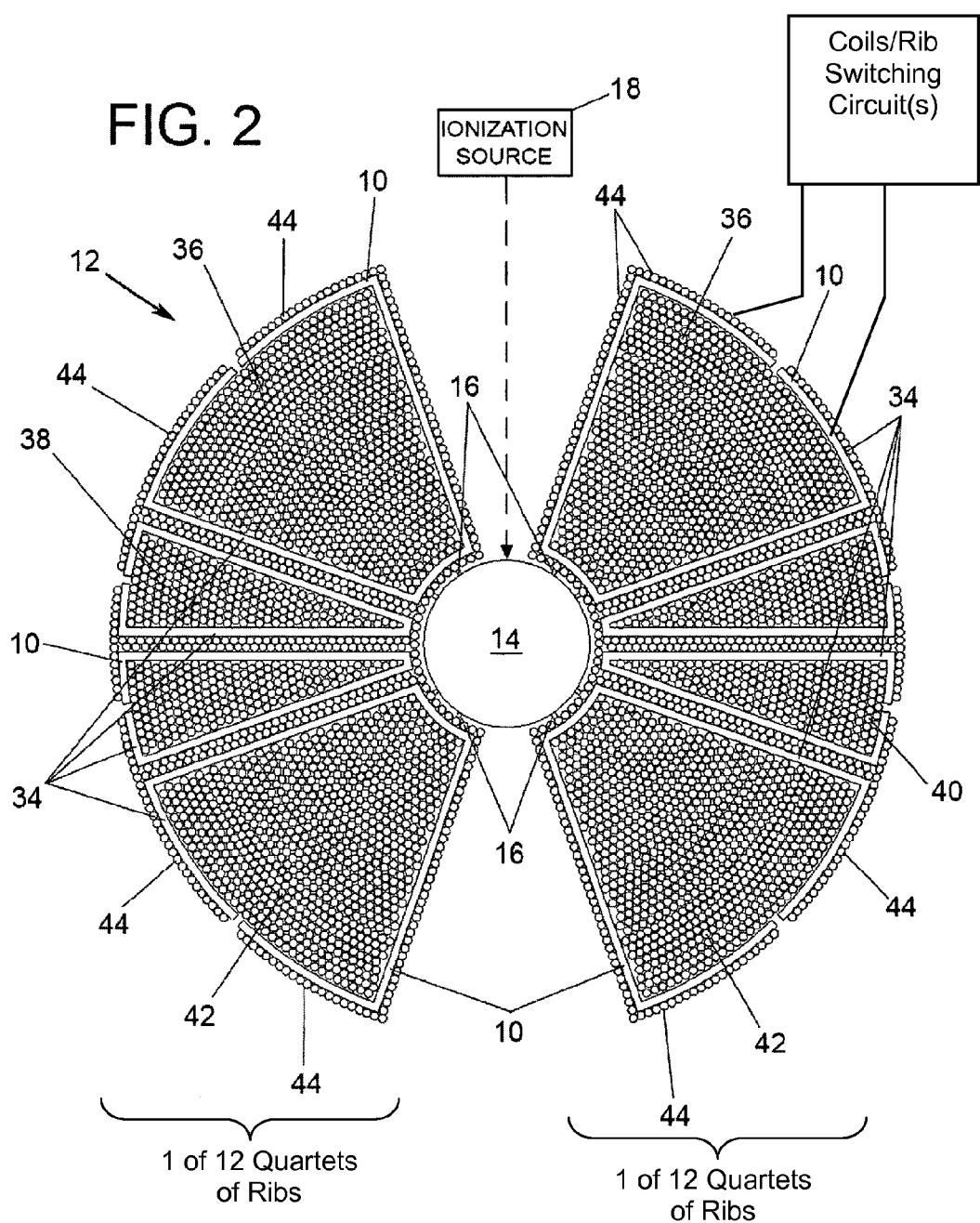
FIG. 2 illustrates a cross-sectional view of ribs and other components included in an MHD simulator according to another embodiment of the present invention.
Figure 3:
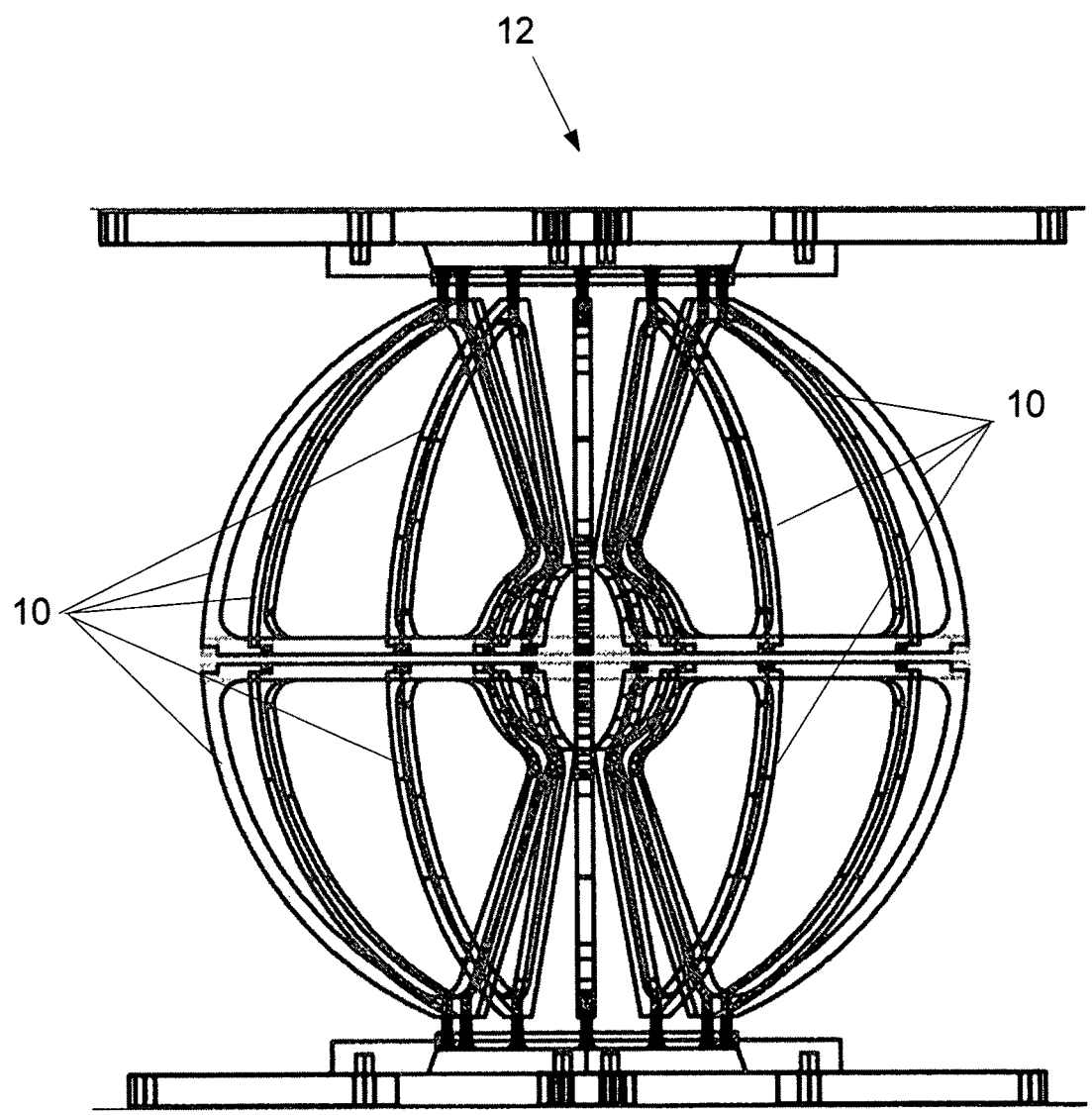
FIG. 3 illustrates a side view of the ribs illustrated in FIG. 1, along with other components included in the MHD simulator that includes these ribs.

The invention will now be described with reference to the drawing figures, in which like reference numerals refer to like parts throughout. FIG. 1 illustrates a perspective view of a plurality of ribs 10 included in a magnetohydrodynamic (MHD) simulator 12 according to an embodiment of the present invention. FIG. 2 illustrates a cross-sectional view of ribs 10 and other components included in an MHD simulator 12 according to another embodiment of the present invention. FIG. 3 illustrates a side view of the ribs 10 illustrated in FIG. 1, along with other components included in the MHD simulator 12 that includes the ribs 10.

As illustrated in FIGS. 1-3, the MHD simulator 12 includes a plasma container 14 positioned substantially at the center thereof. The plasma container 14 may be of any geometry. However, a substantially spherical plasma container 14 is illustrated in FIGS. 1-3. Also, although the plasma container 14 may be supported within the MHD simulator 12 in any manner that will become apparent to one of skill in the art upon practicing one or more embodiments of the present invention, the plasma container 14 illustrated in FIGS. 1-3 is connected to some of the ribs 10 via a plurality of supports 16.

The plasma container 14 illustrated in FIGS. 1-3 has a hollow interior and a solid exterior made of drawn crystal. However, other materials may also be used to form the exterior according to certain embodiments of the present invention.

Contained within the plasma container 14 are one or more ionizable gases. For example, argon, nitrogen, helium, xenon, neon, carbon dioxide, carbon monoxide, and/or krypton may be contained within the plasma container 14, as may a variety of other gases. Typically, before one or more gases are added to the plasma container 14, the interior of the plasma container 14 is evacuated to a vacuum.

As illustrated in FIG. 2, the MHD device 12 includes an ionization source 18 that is focused on the plasma container 14. More specifically, the ionization source 18 is focused on a substantially central portion of the plasma container 14. According to certain embodiments of the present invention, the ionization source 18 is situated such that an energy beam emitted therefrom (e.g., a laser beam illustrated as the dashed line in FIG. 2) strikes the plasma container 14 without contacting any of the ribs 10 included in the MHD simulator 12.

Although the ionization source 18 illustrated in FIG. 2 is a laser, other sources of ionization energy may be used to ionize the one or more gases in the plasma container 14. For example, a radio frequency (RF) ionization source may be used. Also, according to certain embodiments of the present invention, one or more lasers may be used, as may one or more mirrors to direct the laser beam(s) to the plasma container 14, typically through one of the poles (N, S) of the MHD simulator 12 illustrated in FIG. 1. Lasers that may be used include phase conjugate laser, continuous lasers, and pulsed lasers.

Figure 4:
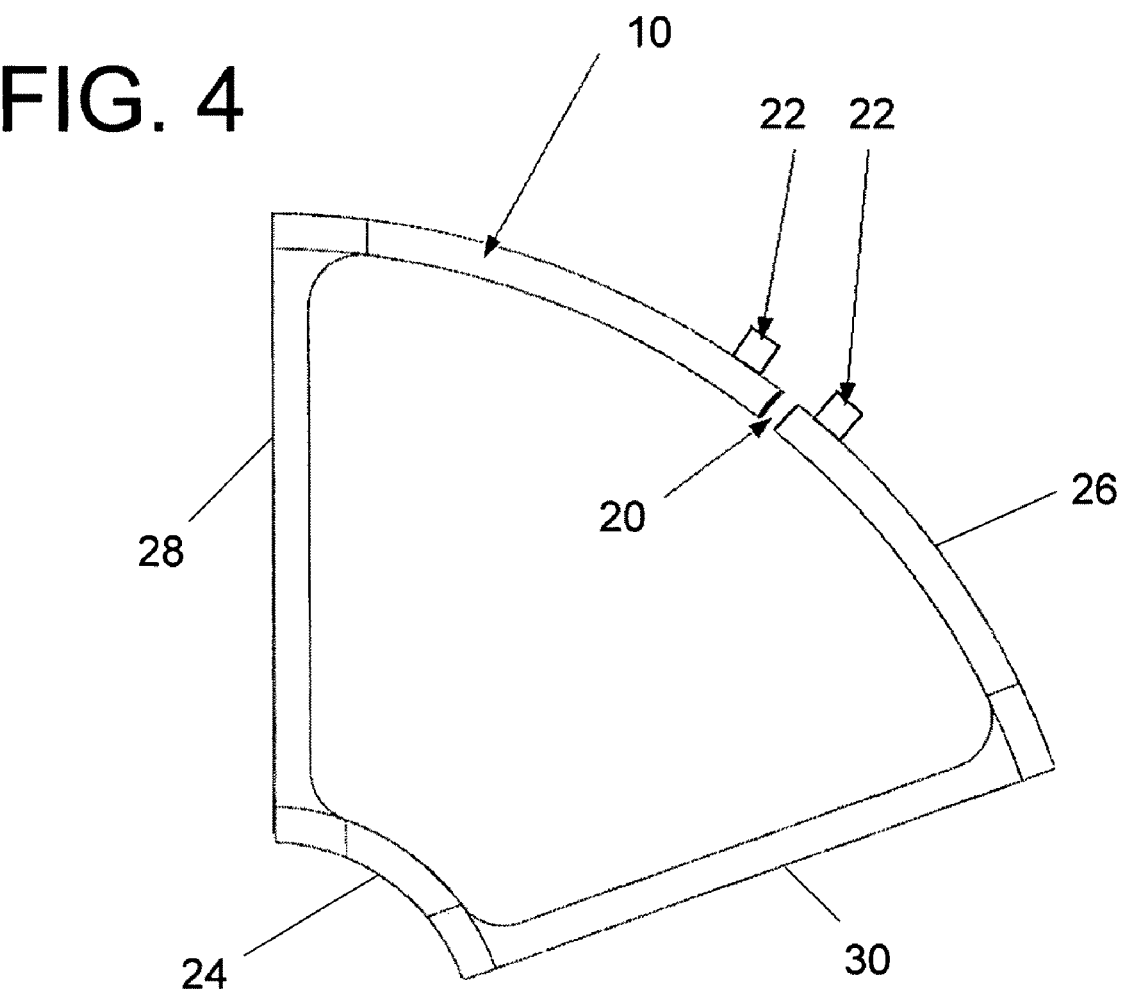
FIG. 4 illustrates a side view of a rib according to certain embodiments of the present invention.

FIG. 4 illustrates a side view of a rib 10 according to certain embodiments of the present invention. As illustrated in FIG. 4, the rib 10 is a loop that, as illustrated in FIG. 2, is positioned adjacent to the plasma container 14. However, rather than being closed, the loop includes a gap 20. On either side of the gap 20 are electrical connections 22 (i.e., electrical contact points) to which electrical wires (not illustrated) may be connected.

According to certain embodiments of the present invention, the ribs 10 are constructed to include loops of conductive material wrapped around a solid rib 10. In addition, according to certain embodiments of the present invention, the ribs 10 are formed from loops of conductive material to form coil structures with a plurality of layers. Some of these layers, according to certain embodiments of the present invention, are used to monitor the coil's field interactions by inductive processes.

Also, according to certain embodiments of the present invention, another independent winding is added to the coil inside the ribs 10. According to such embodiments, the coil is typically toroidal and the independent winding is used for monitor purposes through induction processes. For example, using such induction processes, pulse rate, amperage, voltage levels, etc. may be monitored.

Typically, the above-discussed ribs 10 are made from materials having low magnetic susceptibility and/or high conductivity. For example, according to certain embodiments of the present invention, the ribs 10 include aluminum. Also, the cross-section of the rib 10 illustrated in FIG. 4, according to certain embodiments of the present invention, is substantially square. However, other geometries are also within the scope of the present invention.

As illustrated in FIG. 4, the rib 10 includes a proximate arcuate portion 24 and a distal arcuate portion 26 (relative to the plasma container 14 when the MHD simulator 12 is in operation). The rib 10 illustrated in FIG. 4 also includes a pair of substantially linear portions 28, 30, each connected to both the proximate arcuate portion 24 and the distal arcuate portions 26.

As illustrated in FIG. 4, the proximate arcuate portion 24 and the distal arcuate portion 26 lie substantially along portions of the circumferences of two substantially concentric circles of different sizes (not illustrated). According to certain embodiments of the present invention, the proximate arcuate portion 24 and the distal arcuate portion 26 each extend across approximately 70.52 angular degrees. However, according to other embodiments of the present invention, the arcuate portions 24, 26 may extend across additional or fewer angular degrees. For example, as illustrated in FIG. 2, the ribs 10 illustrated at the top and bottom of the MHD simulator 12 extend across approximately 51.26 angular degrees while the ribs 10 illustrated in the middle of the MHD simulator 12 extend across approximately 19.47 angular degrees.

As illustrated in FIG. 1, there are twelve duos 32 of ribs 10 that are substantially atop each other. Each rib 10 included in each duo 32 is substantially coplanar with the other rib 10 in the duo 32. As also illustrated in FIG. 1, if a plasma container 14 were included in the portion of the MHD simulator 12 illustrated therein, each duo 32 of ribs 10 would be positioned adjacent to the plasma container 14. Also, the twelve duos 32 would be positioned at substantially equal intervals about the plasma container 14. It should be noted that, according to alternate embodiments of the present invention, more or less than twelve duos 32 are included. These duos 32 are typically also placed at substantially equal intervals about the plasma container 14.

FIG. 2 illustrates two quartets 34 of ribs 10. Like the ribs 10 in the duos 32 discussed above, each rib 10 in each quartet 34 is substantially coplanar with the other ribs 10 in the quartet 34. According to certain embodiments of the present invention, twelve quartets 34 are positioned about a plasma container 14 at substantially equal intervals. However, the inclusion of additional or fewer than twelve quartets 34 is also within the scope of certain embodiments of the present invention.

In addition to the components discussed above, the MHD simulator 12 illustrated in FIG. 2 includes a top interior coil 36, an upper middle interior coil 38, a lower middle interior coil 40, and a bottom interior coil 42. Each of these coils 36, 38, 40, 42 is wound about the plasma container 14 and traverses through at least one of the ribs 10.

Also illustrated in FIG. 2 is an exterior coil 44 that is wound about the plasma container 14 and that does not traverse through any of the ribs 10. Rather the exterior coil 44 also winds about the ribs 10. According to certain embodiments of the present invention, instead of a single exterior coil 44 being utilized, each of the inner coils 36, 38, 40, 42 has an associated exterior coil (not illustrated) that is wound about the set of ribs through which the inner coil in question 36, 38, 40, 42 traverses.

Each of these coils 36, 38, 40, 42, 44 typically includes one or more conductive materials. For example, copper is used according to certain embodiments of the present invention.

As discussed above, each rib 10 includes a pair of electrical connections 22. These electrical connections 22 may be connected to one or more wires and/or electrical devices. Also, it should be noted that each of the above-discussed coils 36, 38, 40, 42, 44 may be connected to one or more wires, electrical circuits, and/or electronic devices.

Certain circuits and/or devices according to embodiments of the present invention are used to switch various current and/or voltage levels to individual or pluralities of ribs 10, inner coils 36, 38, 40, 42, and/or outer coils 44 discussed above. This switching, according to certain embodiments of the present invention, produces one or more electromagnetic fields, some of which may be orthogonal to other fields and/or which may be rotating.

In effect, in the embodiments of the present invention discussed above, each rib 10 may effectively become a one-loop or a multiple-loop electromagnet that is pulsed in sequence to produce a rotating magnetic field that would be vertically oriented in the embodiment of the present invention illustrated in FIG. 1. Also, the inner and/or outer coils 36, 38, 40, 42, 44, either individually, in pairs, etc., may be used to create one or more substantially horizontal magnetic fields in FIG. 1.

In order to generate the above-mentioned fields, the ribs 10 and coils 36, 38, 40, 42, 44, may be operably connected to, for example, off-the-shelf current-limited power supplies. Depending on the embodiment of the present invention, single or multiple ribs 10 may be powered with either a single or multiple power supplies.

Computers and electronic switches are also used according to certain embodiments of the present invention to control various combinations of power supply, coil, and/or rib 10 connections. For example, a rapid MOSFET switching circuit may be used to control the flow of current to one or more of the above-discussed coils 36, 38, 40, 42, 44. Also, a digital interface to a control computer may be provided to give a scientist a graphical interface to simplify operation of the MHD simulator 12.

In addition to the above-listed components, sensors and/or other devices may be included in the MHD simulator 12 in order to quantify what is happening in the plasma container 14 and to monitor and control the MHD simulator 12 itself. For example, Langmuir probes may be included to measure electron temperature, electron density, and/or plasma potential. Also, electrometers may be included to measure electrostatic fields, current and/or voltage may be monitored and/or recorded through outputs on the power supplies, and Hall Effect sensors and/or the above-mentioned monitoring coils may be used to measure magnetic fields. In addition, temperatures within the MHD simulator 12 may be measured using thermocouple probes and/or "Heat Spy" devices. Also, UV, IR, and visible light bands may be recorded using appropriate CCD cameras and/or photomultiplier tubes. Such UV, visible, and/or IR imaging sensors may be configured with telescopes, endoscopes and/or fiber-optic bundle systems to relay the images to cameras or other detectors. In addition, two or more rod lens endoscopes may be arranged so that images can be taken as stereo pairs, thus allowing for detailed photogrammetry of plasma shapes and the like within the plasma container 14. Typically, the telescope would be arranged so that its optical path is at right angles to the laser optical path. When observations are needed, a scientist may move a right prism on a swing arm into the laser optical path.

Other sensors may also be included to conduct certain experiments. These sensors may be sensors capable of sensing X-ray flux, gamma ray flux, neutron flux, proton flux, alpha particle flux (e.g., using Geiger counters), a scintillation counter, and/or various other particle counters.

According to certain embodiments of the present invention, providing current to the ribs 10 and/or the inner and outer coils 36, 38, 40, 42, 44, in a properly timed sequence and in specific directions generates rotating double-toroidal flow patterns in the highly ionized plasma contained in the plasma container 14.

More specifically, in operation, one or more ionizable gases are placed in the plasma container 14. The plasma container 14 is then placed in the center cavity of the substantially spherical structure formed by the ribs 10 and inner and outer coils 36, 38, 40, 42, 44, discussed above. The ionization source 18 is then energized and used to ionize the gases in the plasma container 14. Pulsing of the inner and outer coils is then initiated at the same time as the rib pulsing.

One representative reason for generating the above-mentioned rotating double-toroidal flow patterns in the highly ionized plasma contained in the plasma container 14 is the result of evidence that this pattern is found in the universe at multiple scales. For example, there is evidence that the circulation of matter around galaxies, including black holes' ergospheres, is closely modeled to such a double torus pattern, which is predicted by the Haramein-Rauscher solution to Einstein's field equation. Furthermore, examples of that pattern are found in quasars, pulsars and the Coriolis forces of the plasma dynamics surrounding our sun and planets such as Saturn and Jupiter. Devices according to certain embodiments of the present invention, allow for such patterns to be generated in a low-energy lab environment.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A magnetohydrodynamic simulator, comprising:
    a spherical non-conducting plasma container configured to contain a first ionizable gas, the container having an axial pole;
    a first solid rib loop coplanar with the axial pole, positioned adjacent to and extending radially from the spherical plasma container, wherein the first loop includes a gap, a first electrical connection on a first side of the gap, a second electrical connection of a second side of the gap, and a first material having at least one of low magnetic susceptibility and high conductivity; and
    an electrically conductive first coil wound about the plasma container and orthogonally through the first solid rib loop.

2. The magnetohydrodynamic simulator of claim 1, wherein the first loop comprises:
    a first arcuate portion;
    a first linear portion connected to the first arcuate portion;
    a second linear portion connected to the first arcuate portion; and
    a second arcuate portion connected to the first linear portion and the second linear portion, wherein the first arcuate portion and the second arcuate portion lie substantially along portions of circumferences of substantially concentric circles of different sizes.

3. The magnetohydrodynamic simulator of claim 2, wherein the first arcuate portion extends across approximately 70.52 angular degrees.

4. The magnetohydrodynamic simulator of claim 2, wherein
    the second arcuate portion is positioned proximate to the plasma container and the first arcuate portion is positioned distal from the plasma container, the second arcuate portion has an arcuate length shorter than that of the first arcuate portion, and the first arcuate portion has the gap therein; and the electrically conductive first coil is different from the first loop and wound about the plasma container and a plurality of times through the first loop.

5. The magnetohydrodynamic simulator of claim 1, further comprising:
a second loop positioned adjacent to the plasma container, wherein the second loop includes a second gap, a third electrical connection on a first side of the second gap and a fourth electrical connection on a second side of the second gap, and wherein the second loop includes a second material having at least one of low magnetic susceptibility and high conductivity.

6. The magnetohydrodynamic simulator of claim 5, wherein the first arcuate portion extends across approximately 51.26 angular degrees and wherein the second loop includes a third arcuate portion extending across approximately 19.47 angular degrees.

7. The magnetohydrodynamic simulator of claim 6, further comprising an electrically conductive second coil wound about the plasma container and through the second loop.

8. The magnetohydrodynamic simulator of claim 5, wherein the first arcuate portion extends across approximately 70.52 angular degrees and wherein the second loop includes a third arcuate portion extending across approximately 70.52 angular degrees.

9. The magnetohydrodynamic simulator of claim 1, wherein the first loop and the second loop are substantially coplanar and thereby make up a first duo of ribs, the simulator further comprising:
eleven additional duos of ribs positioned adjacent to the plasma container, wherein the first duo of ribs and the eleven additional duos of ribs are positioned at substantially equal intervals about the plasma container.

10. The magnetohydrodynamic simulator of claim 1, further comprising:
a third loop positioned adjacent to the plasma container, wherein the third loop includes a third gap, a fifth electrical connection on a first side of the third gap and a sixth electrical connection on a second side of the third gap, and wherein the third loop includes a third material having at least one of low magnetic susceptibility and high conductivity; and
a fourth loop positioned adjacent to the plasma container, wherein the fourth loop includes a fourth gap, a seventh electrical connection on a first side of the fourth gap and an eighth electrical connection on a second side of the fourth gap, and wherein the fourth loop includes a fourth material having at least one of low magnetic susceptibility and high conductivity.

11. The magnetohydrodynamic simulator of claim 10, wherein the first loop, the second loop, the third loop, and the fourth loop are all substantially co-planar.

12. The magnetohydrodynamic simulator of claim 10, wherein the third loop includes a fourth arcuate portion extending across approximately 51.26 angular degrees and wherein the fourth loop includes a fifth arcuate portion extending across approximately 19.47 angular degrees.

13. The magnetohydrodynamic simulator of claim 10, further comprising:
an electrically conductive third coil wound about the plasma container and through the third loop; and
an electrically conductive fourth coil wound about the plasma container and through the fourth loop.

14. The magnetohydrodynamic simulator of claim 10, wherein the first loop, the second loop, the third loop, and the fourth loop are all substantially coplanar and thereby make up a first quartet of ribs, the simulator further comprising:
eleven additional quartets of ribs positioned adjacent to the plasma container, wherein the first quartet of ribs and the eleven additional quartets of ribs are positioned at substantially equal intervals about the plasma container.

15. The magnetohydrodynamic simulator of claim 14, further comprising:
circuitry operably connected to the first quartet of ribs and to the eleven additional quartets of ribs and to the electrically conductive first, second, third, and fourth coils, wherein the circuitry is configured to apply current to the first quartet of ribs, to the eleven additional quartets of ribs and to the electrically conductive first, second, third, and fourth coils so as to generate substantially orthogonal magnetic fields.

16. The magnetohydrodynamic simulator of claim 15, wherein the circuitry is further configured to cause the magnetic fields to rotate.

17. The magnetohydrodynamic simulator of claim 1, wherein the plasma container comprises drawn crystal.

18. The magnetohydrodynamic simulator of claim 1, further comprising: an ionization source focused on a portion of the plasma container.

19. The magnetohydrodynamic simulator of claim 1, further comprising:
circuitry operably connected to the first electrical connection, the second electrical connection, and the first coil, wherein the circuitry is configured to apply current to the first coil and to apply electrical pulses to the first loop.

20. The magnetohydrodynamic simulator of claim 1, further comprising:
an electrically conductive second coil wound about the plasma container and also wound about an outer perimeter of the first loop.

21. The magnetohydrodynamic simulator of claim 1, further comprising:
a second ionizable gas substantially contained within the plasma container.

* * * * *